United States Patent
Takano et al.

(10) Patent No.: US 7,233,188 B1
(45) Date of Patent: Jun. 19, 2007

(54) METHODS AND APPARATUS FOR REDUCING POWER CONSUMPTION IN A PROCESSOR USING CLOCK SIGNAL CONTROL

(75) Inventors: Chiaki Takano, Austin, TX (US); Daniel Lawrence Stasiak, Austin, TX (US); Nathan Paul Chelstrom, Cedar Park, TX (US); Steven Ross Ferguson, Granite Shoals, TX (US)

(73) Assignee: Sony Computer Entertainment Inc., Tokyo (JP)

( * ) Notice: Subject to any disclaimer, the term of this patent is extended or adjusted under 35 U.S.C. 154(b) by 42 days.

(21) Appl. No.: 11/318,228

(22) Filed: Dec. 22, 2005

(51) Int. Cl.
*G06F 1/04* (2006.01)
(52) U.S. Cl. ...................... 327/291; 713/323
(58) Field of Classification Search .............. 327/99, 327/291, 544; 713/323
See application file for complete search history.

(56) References Cited

U.S. PATENT DOCUMENTS 6,259,291 B1 * 7/2001 Huang ........................ 327/160

* cited by examiner

*Primary Examiner*—Kenneth B. Wells
(74) *Attorney, Agent, or Firm*—Matthew B. Dernier; Kaplan Gilman Gibson & Dernier

(57) ABSTRACT

Methods and apparatus provide for: producing a control signal at a first substantially steady state logic level indicative of a sleep mode, and at a second substantially steady state logic level indicative of a normal mode; producing a gate signal that is at a substantially steady state null level when the control signal is at the first logic level, and that oscillates at a local clock frequency when the control signal is at the second logic level; producing a local clock signal from a system clock signal as a function of the gate signal; and interposing at least one signal propagation latch circuit between an origin of the control signal and the location at which the gate signal is produced.

17 Claims, 5 Drawing Sheets

METHODS AND APPARATUS FOR REDUCING POWER CONSUMPTION IN A PROCESSOR USING CLOCK SIGNAL CONTROL

BACKGROUND OF THE INVENTION

The present invention relates to managing power consumption in a processor through clock signal gating and control.

Where power consumption in a processing system is of concern, conventional techniques to reduce power consumption and dissipation include causing the processing system to enter into a sleep mode in which processing functions are shut down, operating voltage/current is cut off, and/or clock signals are gated off. With reference to FIG. 1, an existing processing system 10 is illustrated, which may or may not be prior art to the instant invention. The processing system 10 includes a clock control unit 12 and a plurality of branch circuits 14A, 14B, 14C, 14D operable to distribute clock control signaling to various portions of the processing system 10 in accordance with a tree or rake structure. Each branch circuit 14 includes a local clock buffer circuit 16 (only circuit 16A being shown) in order to start or stop a clock signal that is distributed to a local area of the processing system 10 and/or in order to modulate the clock frequency from a high frequency input clock (HFCLK) to a low frequency output clock (LFCLK).

FIG. 2 is a timing diagram that graphically illustrates relationships among the HFCLK signal, the LFCLK signal, and a control (CONT) signal of the processing system 10. The transformation of the HFCLK signal to the LFCLK signal is accomplished within the local clock buffer 16 as a function of the CONT signal issued from the clock control unit 12. The CONT signal is a square-wave signal transitioning at about one-half the frequency of the HFCLK signal. The local clock buffer 16 may include combinational logic (such as a NAND gate) to produce the LFCLK signal from the HFCLK signal and the CONT signal.

As there may be a significant distance between the clock control unit 12 and the local buffers 16, each branch circuit 14 may include multiple flip-flop stages to accommodate signal delays and propagate the CONT signal to all of the local clock buffers 16.

The clock control unit 12 may be employed in the processing system 10 in order to facilitate the gating of the HFCLK signal(s) to the respective local areas of the processing system 10, the distribution of the LFCLK, and to achieve a sleep mode in which the LFCLK signal is shut down. The clock control unit 12 may facilitate entering and exiting the sleep mode by turning the CONT signal OFF (for sleep mode) and ON (for normal mode).

Among the problems with this approach is that the distribution of the CONT signal throughout the processing system 10 requires the use of the multiple flip-flop stages. The many transitions of the flip-flops to propagate the CONT signal results in high power consumption and dissipation within the processing system. Accordingly, there are needs in the art for new solutions to the problem of power reduction in a processing system using clock signal control.

SUMMARY OF THE INVENTION

In accordance with one or more aspects of the present invention, a clock control unit does not output a CONT signal that oscillates at a relatively low frequency as compared with the high frequency clock signal. Instead, the clock control unit outputs a relatively steady state control signal, which is at a steady state low level in the sleep mode and at a steady state high level during normal operation. In addition, a new divider/gate circuit is provided between the clock control unit and each local clock buffer. The divider/gate circuit includes a gated low frequency oscillator that produces a low frequency clock signal (e.g., 2 GHz) when the steady state control signal is high and produces a null signal when the steady state control signal is low. The output of the divider/gate circuit is input to combinational logic of the given local clock buffer (along with the high frequency clock signal) to produce a synchronized low frequency clock signal for the given local area of the processor.

Although the steady state control signal may also be propagated through a plurality of flip flop circuits to a given local clock buffer circuit, it does not cause the flip flops to transition at a high frequency. Thus, significantly lower power consumption and dissipation is achieved in the processing system.

According to one or more embodiments of the invention, an apparatus includes: a clock control unit operable to produce a control signal at a first substantially steady state logic level indicative of a sleep mode, and at a second substantially steady state logic level indicative of a normal mode; at least one divider/gate circuit operable to produce a gate signal that is at a substantially steady state null level when the control signal is at the first logic level, and that oscillates at a local clock frequency when the control signal is at the second logic level; and at least one local clock buffer circuit operable to produce a local clock signal from a system clock signal as a function of the gate signal.

At least one signal propagation latch circuit is preferably interposed between the control signal produced by the clock control unit and the divider/gate circuit. Alternatively, a plurality of signal propagation latch circuits are interposed between the control signal produced by the clock control unit and the divider/gate circuit. In one or more embodiments, there are no signal propagation latch circuits interposed between the divider/gate circuit and the local clock buffer circuit. In other embodiments, at least one signal propagation latch circuit is interposed between the divider/gate circuit and the local clock buffer circuit. If so, a greater number of signal propagation latch circuits are preferably interposed between the control signal and the divider/gate circuit than between the divider/gate circuit and the local clock buffer circuit.

The divider/gate circuit may be operable to produce the gate signal such that the oscillation at a local clock frequency is lower than a frequency of the system clock. For example, the divider/gate circuit may include a gated digital oscillator operable to use the control signal to enable the digital oscillator to produce the gate signal.

The local clock buffer circuit may be operable to produce the local clock signal from the system clock signal such that a frequency of the local clock signal is synchronized with the local clock frequency of the gate signal. For example, the local clock buffer circuit may include combinational logic to produce the local clock signal from the system clock signal as a function of the gate signal. To this end, the local clock buffer circuit may include at least one of an AND gate and a NAND gate receiving the system clock signal and the gate signal and producing the local clock signal therefrom.

According to one or more further embodiments of the invention, a method includes: producing a control signal at a first substantially steady state logic level indicative of a sleep mode, and at a second substantially steady state logic level indicative of a normal mode; producing a gate signal that is at a substantially steady state null level when the control signal is at the first logic level, and that oscillates at a local clock frequency when the control signal is at the second logic level; producing a local clock signal from a system clock signal as a function of the gate signal; and interposing at least one signal propagation latch circuit between an origin of the control signal and the location at which the gate signal is produced.

Other aspects, features, advantages, etc. will become apparent to one skilled in the art when the description of the preferred embodiments of the invention herein is taken in conjunction with the accompanying drawings.

BRIEF DESCRIPTION OF THE DRAWINGS

For the purposes of illustrating the various aspects of the invention, there are shown in the drawings forms that are presently preferred, it being understood, however, that the invention is not limited to the precise arrangements and instrumentalities shown.

DETAILED DESCRIPTION OF THE PREFERRED EMBODIMENTS

Figure 1:
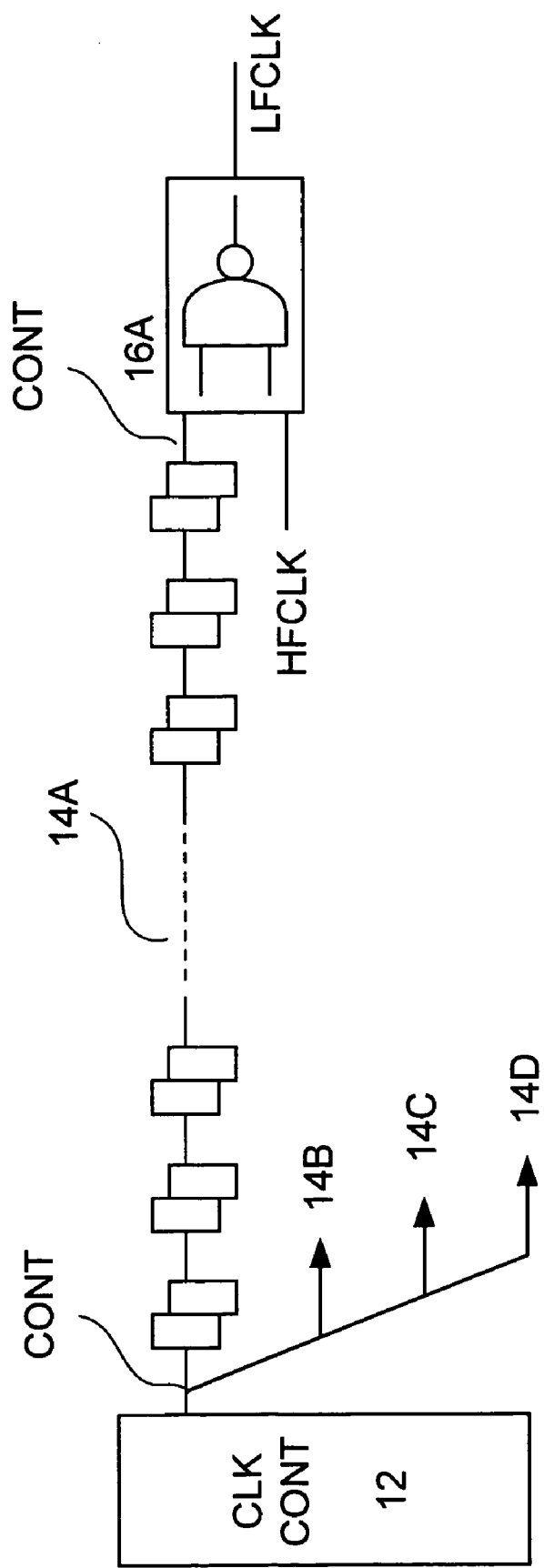
FIG. 1 is block diagram of a processing system in which an clock control signal is distributed throughout the system to facilitate sleep mode control in accordance with an exiting technique.
Figure 2:
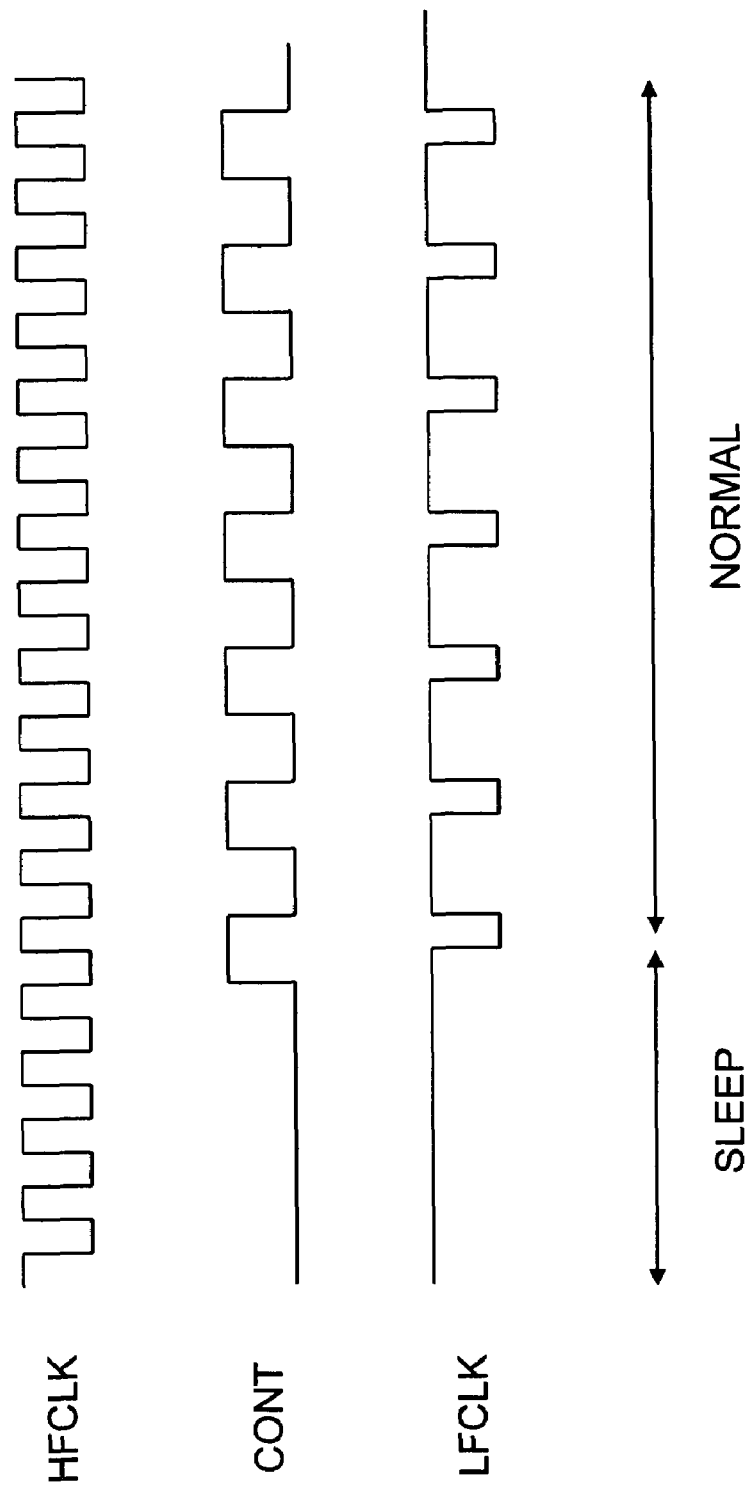
FIG. 2 is a timing diagram illustrating relationships among some signals of the system of FIG. 1.
Figure 3:
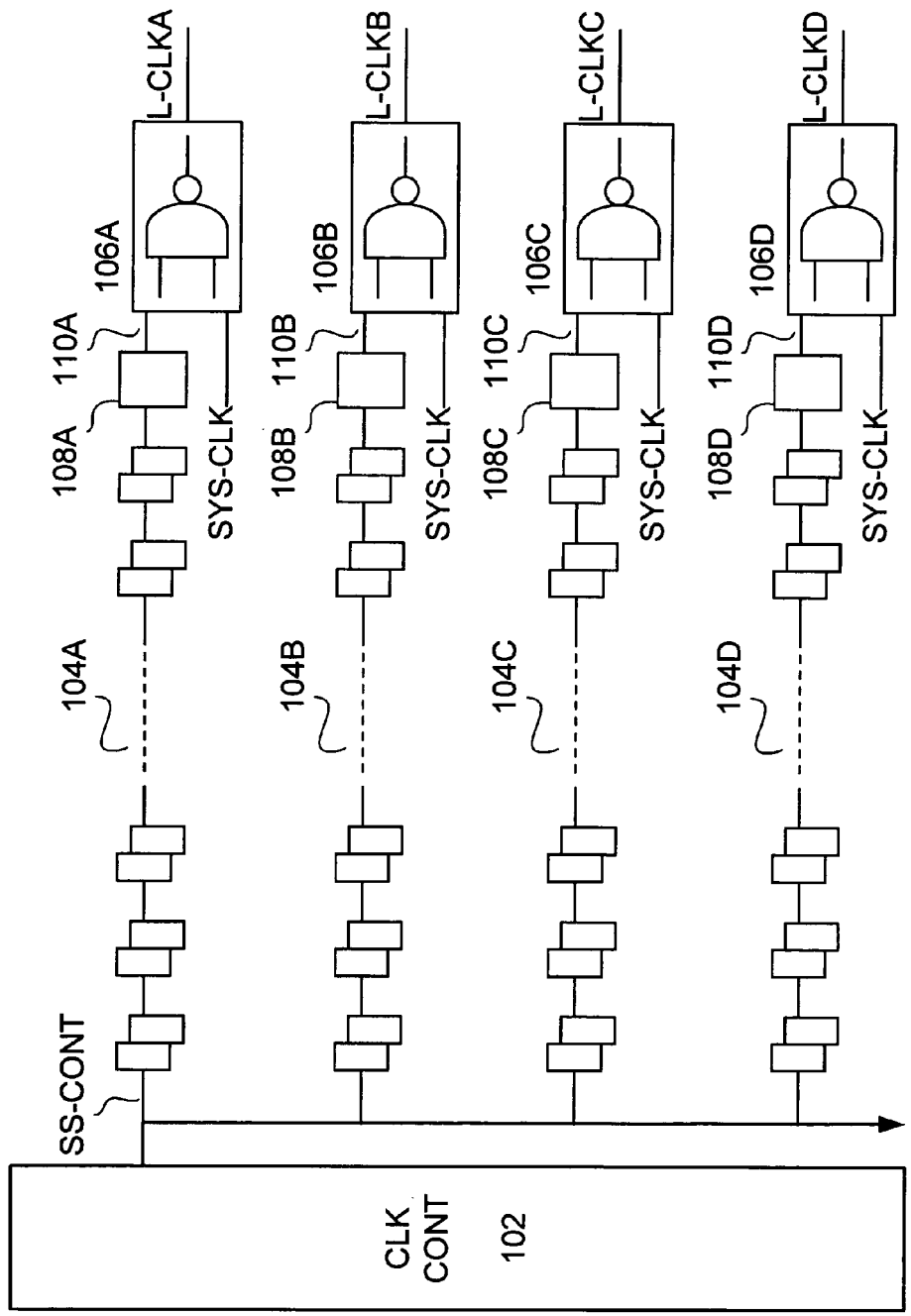
FIG. 3 is block diagram of a processing system in which a substantially steady state control signal is distributed throughout the system to facilitate sleep mode control in accordance with one or more embodiments of the present invention.

With reference to the drawing, wherein like numerals indicate like elements, there is shown in FIG. 3 a portion of a processing system 100 in accordance with one or more aspects of the present invention. For the purposes of discussion, some details are set forth to provide a thorough understanding of the present invention, although those skilled in the art will appreciate that certain aspects of the present invention may be practiced without such specific details. Further, some well-known elements have been illustrated in block diagram form in order not to obscure the present invention by presenting unnecessary detail. Additionally, some details have been omitted altogether as such need not be discussed in order to appreciate the various aspects of the present invention, and are considered to be within the understanding of persons of ordinary skill in the relevant art.

Although not shown in the figures, it is assumed that those skilled in the art understand that the processing system 100 may be a single or multi-processing system generally having access to one or more memories, one or more execution circuits, hardware registers, interconnecting busses, etc. For example, the processing system 100 may be implemented utilizing any of the known technologies that are capable of requesting data from the memory, and manipulating the data to achieve a desirable result. For example, the processing system may include any of the known microprocessors that are capable of executing software and/or firmware, including standard microprocessors, distributed microprocessors, etc.

By way of example, the processing system may be implemented using a processing pipeline, in which logic instructions are processed in a pipelined fashion. Although the pipeline may be divided into any number of stages at which instructions are processed, the pipeline may generally comprise fetching one or more instructions, decoding the instructions, checking for dependencies among the instructions, issuing the instructions, and executing the instructions. In this regard, the processing system 100 may include an instruction buffer, instruction decode circuitry, dependency check circuitry, instruction issue circuitry, and execution stages.

Although not shown, various alternative embodiments of the processing system 100 may include an Input/Output (I/O) interface for inputting and outputting data from/to various circuits and/or peripheral devices, a memory interface for managing access to data residing in memory.

To achieve the functionality above, the processing system 100 employs a system clock signal to synchronously execute certain logic functions. Although the system clock signal may be defined in any number of ways, by way of illustration the system clock signal SYS-CLK is split into many paths to service local areas of the processing system 100. Ideally, the system clock signals at different portions of the digital circuitry exhibit exactly the same timing characteristics so that the different portions of the digital circuit operate in exact synchronization.

The processing system 100 includes a clock control unit 102 and a plurality of branch circuits 104A, 104B, 104C, 104D operable to distribute clock signaling to various portions of the processing system 100 in accordance with a tree or rake structure. Each branch circuit 104 includes a local clock buffer circuit 106 in order to buffer the SYS-CLK signal and distribute a local clock (L-CLK) signal to a corresponding local area of the processing system 100. Each branch circuit 104 also includes a divider/gate circuit 108 operable to produce a gate control signal 110 for use by the associated local clock buffer circuit 106.

The clock control unit 102 may be employed in the processing system 100 in order to facilitate the gating of the L-CLK signal(s) to the respective local areas of the processing system 100, and to achieve a sleep mode in which the L-CLK signal is shut down. The clock control unit 102 is preferably operable to produce a control signal SS-CONT at a first substantially steady state logic level to invoke the sleep mode. In addition, the clock control unit 102 is preferably operable to produce the control signal SS-CONT at a second substantially steady state logic level to invoke a normal mode of operation in which the processing system 100 may execute tasks.

Each branch circuit 104 includes multiple latch circuits (such as flip-flop stages) to accommodate signal delays and propagate the SS-CONT signal to the associated divider/gate circuit 108. Each divider/gate circuit 108 is preferably operable to produce the given gate signal 110 such that it is at a substantially steady state null level when the SS-CONT signal is at the first logic level. Each divider/gate circuit 108 is further preferably operable to produce the given gate signal 110 such that it oscillates at a local clock frequency when the SS-CONT signal is at the second logic level.

Each local clock buffer circuit 106 is operable to produce a local clock (L-CLK) signal from the SYS-CLK signal as a function of the associated gate signal 110. Thus, the SS-CONT signal may be used to affect the characteristics of the L-CLK signals to the local areas of the processing system 100 to facilitate the invocation of the sleep mode and the normal mode. This will be discussed in more detail below.

Figure 4:
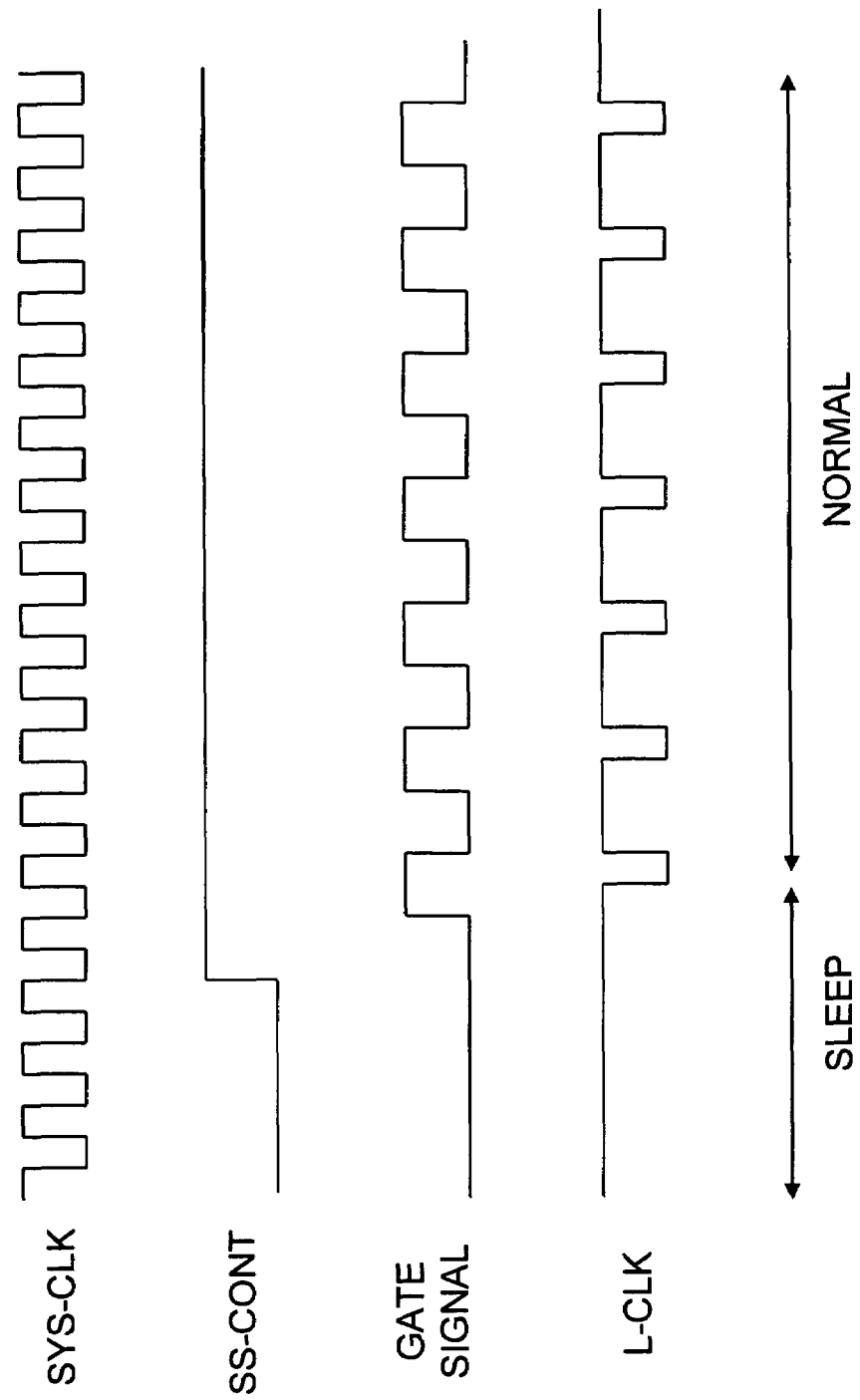
FIG. 4 is a timing diagram illustrating relationships among some signals of the system of FIG. 3.

FIG. 4 is a timing diagram that graphically illustrates relationships among the SS-CONT signal, the gate signal, the SYS-CLK signal, and the L-CLK signal of the processing system 100. The signal relationships are presented as compared with a timeline in which the processing system 100 transitions between a sleep mode and a normal mode of operation. Those skilled in the will appreciate that the processing system 100 may also transition from the normal mode to the sleep mode without departing from the scope of various embodiments of the instant invention.

As shown by the timeline, the processing system 100 may enter a sleep mode, in which task execution is not carried out, and a normal mode, in which processing tasks are executed. During the sleep mode, the clock control unit 102 is operable to produce the SS-CONT signal at a first substantially steady state logic level, such as a logic low level. In response, the divider/gate circuit 108 is operable to produce the gate signal 110 such that it is at a substantially steady state null level, such as a logic low level. In response to the null gate signal level, the local clock buffer circuit 106 produces an L-CLK signal that does not oscillate. Thus, the local area of the processing system 100 does not receive an operative clock signal L-CLK. This prevents instruction execution and significantly reduces power consumption in the processing system 100.

When the processing system 100 transitions from the sleep mode to the normal mode, the clock control unit 102 transitions the SS-CONT signal from the first steady state level to a second steady state level, e.g., a logic high level. In response, the divider/gate circuit 108 produces the gate signal 110 such that it oscillates at the local clock frequency. In the illustrated example, the local clock frequency is lower than the frequency of the SYS-CLK signal. By way of example, the SYS-CLK signal may oscillate at about 4 GHz while the local clock frequency may be on the order of 2 GHz. The combinational logic within the local clock buffer circuit 106 receives the gate signal 110 and the SYS-CLK signal and produces the L-CLK signal therefrom. For example, the local clock buffer circuit 106 may include one or more logic gates, such as AND and/or NAND gates. Assuming that NAND gate(s) are employed, the logic result is a low output level on L-CLK when both the SYS-CLK signal and gate signal are at logic high levels, and a high output level on L-CLK when either of those signals are at a logic low level. Consequently, the L-CLK signal is synchronized with the local clock frequency of the gate signal 110 and the SYS-CLK signal.

Figure 5A:
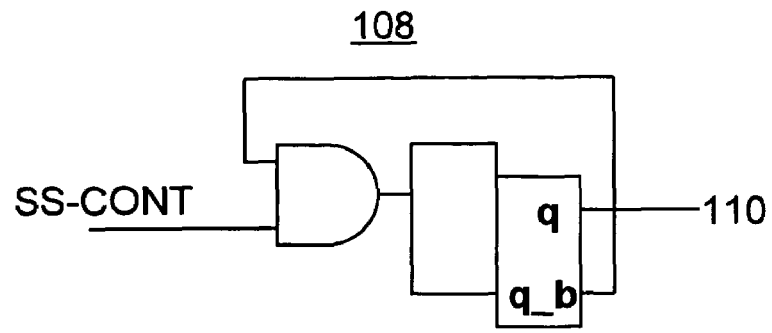
FIGS. 5A, B, and C are detailed circuit diagrams of divider/gate circuits suitable for use in the system of FIG. 3 for facilitating the sleep mode control.
Figure 5B:
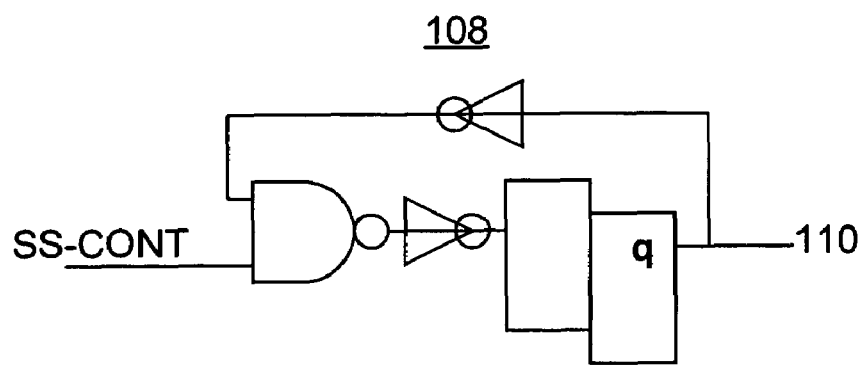
Figure 5C:
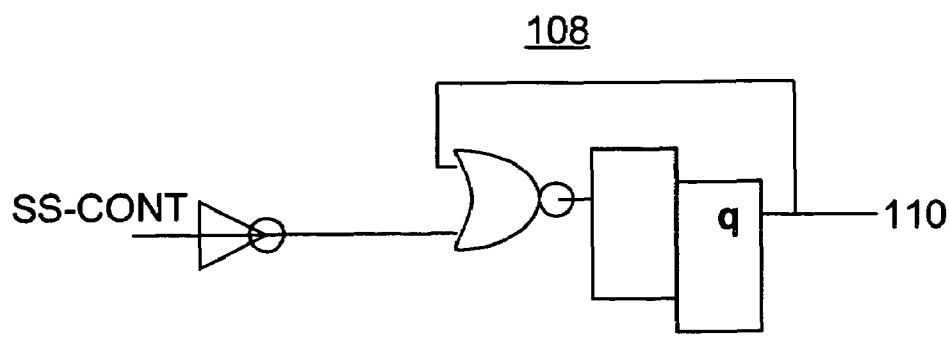

The divider/gate circuit 108 preferably includes a gated digital oscillator operable to use the SS-CONT signal to enable/disable the digital oscillator and to produce the gate signal 110 therefrom. By way of example, the divider/gate circuit 108 may be implemented utilizing one or more of the logic circuits illustrated in FIGS. 5A, 5B, and 5C. In each circuit implementation, the input signal to the divider/gate circuit 108 gates the oscillator created by the feedback around the flip flop circuit.

Turning again to FIG. 3, the plurality of signal propagation latch circuits 104, interposed between the SS-CONT signal issuing from the clock control unit 102 and the divider/gate circuit 108, do not oscillate at any significant frequency, such as the local clock frequency. Indeed, the SS-CONT signal is substantially steady state other than during a transition from the sleep mode to the normal mode or vice versa. Advantageously, this reduces power dissipation in the propagation latch circuits 104 during sleep mode and during normal operation. Preferably, there are no signal propagation latch circuits 104 interposed between the divider/gate circuit 108 and the local clock buffer circuit 106. On the other hand, if any signal propagation latch circuits are in fact interposed between the divider/gate circuit 108 and the local clock buffer circuit 106, then it is preferred that a relatively small number are employed. Indeed, advantageous power savings are achieved when a greater number of signal propagation latch circuits 104 exist between the clock control unit 102 and the divider/gate circuit 108 as compared with the number of signal propagation latch circuits (if any) between the divider/gate circuit 108 and the local clock buffer circuit 106.

It is noted that the methods and apparatus herein may be implemented utilizing any of the known technologies, such as standard digital circuitry, analog circuitry, microprocessors, digital signal processors, any of the known processors that are operable to execute software and/or firmware programs, programmable digital devices or systems, programmable array logic devices, or any combination of the above, including devices now available and/or devices which are hereinafter developed.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. An apparatus, comprising:
a clock control unit operable to produce a control signal at a first substantially steady state logic level indicative of a sleep mode, and at a second substantially steady state logic level indicative of a normal mode;
at least one divider/gate circuit operable to produce a gate signal that is at a substantially steady state null level when the control signal is at the first logic level, and that oscillates at a local clock frequency when the control signal is at the second logic level; and
at least one local clock buffer circuit operable to produce a local clock signal from a system clock signal as a function of the gate signal,
wherein at least one signal propagation latch circuit is interposed between the clock control unit and the divider/gate circuit.

2. The apparatus of claim 1, wherein a plurality of signal propagation latch circuits are interposed between the clock control unit and the divider/gate circuit.

3. The apparatus of claim 2, wherein there are no signal propagation latch circuits interposed between the divider/gate circuit and the local clock buffer circuit.

4. The apparatus of claim 2, further comprising at least one signal propagation latch circuit interposed between the divider/gate circuit and the local clock buffer circuit.

5. The apparatus of claim 4, wherein a greater number of signal propagation latch circuits are interposed between the control signal and the divider/gate circuit than between the divider/gate circuit and the local clock buffer circuit.

6. The apparatus of claim 1, wherein the divider/gate circuit is operable to produce the gate signal such that the oscillation at a local clock frequency is lower than a frequency of the system clock.

7. The apparatus of claim 6, wherein the divider/gate circuit includes a gated digital oscillator operable to use the control signal to enable the digital oscillator to produce the gate signal.

8. The apparatus of claim 6, wherein the local clock buffer circuit is operable to produce the local clock signal from the system clock signal such that a frequency of the local clock signal is synchronized with the local clock frequency of the gate signal.

9. The apparatus of claim 8, wherein the local clock buffer circuit includes combinational logic to produce the local clock signal from the system clock signal as a function of the gate signal.

10. The apparatus of claim 9, wherein the local clock buffer circuit includes at least one of an AND gate and a NAND gate receiving the system clock signal and the gate signal and producing the local clock signal therefrom.

11. A method, comprising:
producing a control signal at a first substantially steady state logic level indicative of a sleep mode, and at a second substantially steady state logic level indicative of a normal mode;
producing a gate signal that is at a substantially steady state null level when the control signal is at the first logic level, and that oscillates at a local clock frequency when the control signal is at the second logic level;
producing a local clock signal from a system clock signal as a function of the gate signal; and
interposing at least one signal propagation latch circuit between an origin of the control signal and the location at which the gate signal is produced.

12. The method of claim 11, further comprising interposing a plurality of signal propagation latch circuits between the origin of the control signal and the location at which the gate signal is produced.

13. The method of claim 12, further comprising interposing no signal propagation latch circuits between the location at which the gate signal is produced and the location at which the local clock signal is produced.

14. The method of claim 12, further comprising interposing at least one signal propagation latch circuit between the location at which the gate signal is produced and the location at which the local clock signal is produced.

15. The method of claim 14, further comprising interposing a greater number of signal propagation latch circuits between the origin of the control signal and the location at which the gate signal is produced than between the location at which the gate signal is produced and the location at which the local clock signal is produced.

16. The method of claim 10, further comprising producing the gate signal such that the oscillation at a local clock frequency is lower than a frequency of the system clock.

17. The method of claim 16, further comprising producing the local clock signal from the system clock signal such that a frequency of the local clock signal is synchronized with the local clock frequency of the gate signal.

* * * * *

UNITED STATES PATENT AND TRADEMARK OFFICE
CERTIFICATE OF CORRECTION

| | | |
|---|---|---|
| PATENT NO. | : 7,233,188 B1 | Page 1 of 1 |
| APPLICATION NO. | : 11/318228 | |
| DATED | : June 19, 2007 | |
| INVENTOR(S) | : Chiaki Takano et al. | |

It is certified that error appears in the above-identified patent and that said Letters Patent is hereby corrected as shown below:

On title page Item [73]

The Assignee should read as follows:

Sony Computer Entertainment Inc.

International Business Machines Corporation

Signed and Sealed this

Thirteenth Day of May, 2008

JON W. DUDAS
*Director of the United States Patent and Trademark Office*